US012222423B2

(12) United States Patent
Jalali et al.

(10) Patent No.: US 12,222,423 B2
(45) Date of Patent: *Feb. 11, 2025

(54) METHOD AND SYSTEM FOR VEHICULAR LIDAR AND COMMUNICATION UTILIZING A VEHICLE HEAD LIGHT AND/OR TAILLIGHT AND COMMUNICATING WITH VEHICLE SUBSYSTEMS

(71) Applicant: WIRELESS PHOTONICS, LLC, El Segundo, CA (US)

(72) Inventors: Bahram Jalali, Los Angeles, CA (US); Alexandra Jalali, Los Angeles, CA (US); Mehdi Hatamian, Mission Viejo, CA (US); Ahmadreza Rofougaran, Newport Coast, CA (US)

(73) Assignee: Wireless Photonics, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/809,262

(22) Filed: Aug. 19, 2024

(65) Prior Publication Data

US 2024/0418861 A1 Dec. 19, 2024

Related U.S. Application Data

(63) Continuation of application No. 18/596,256, filed on Mar. 5, 2024, now Pat. No. 12,066,547, which is a
(Continued)

(51) Int. Cl.
*G01S 17/00* (2020.01)
*G01S 17/10* (2020.01)
(Continued)

(52) U.S. Cl.
CPC ............ *G01S 17/894* (2020.01); *G01S 17/10* (2013.01); *G06T 7/50* (2017.01); *G06T 17/05* (2013.01)

(58) Field of Classification Search
USPC .................................................. 356/4.01, 5.01
See application file for complete search history.

(56) References Cited

U.S. PATENT DOCUMENTS 10,225,011 B1 * 3/2019 Schubert ............ H04B 10/1121
10,816,939 B1 * 10/2020 Coleman ................. G01S 17/86
(Continued)

FOREIGN PATENT DOCUMENTS

| CN | 102379156 A | * | 3/2012 | ........... G01S 7/4814 |
| CN | 110121661 A | * | 8/2019 | ............ G01S 17/89 |

*Primary Examiner* — James R Hulka
(74) *Attorney, Agent, or Firm* — Mark R. Kendrick

(57) ABSTRACT

A method of measuring a distance between a vehicle and one or more objects, includes generating a modulation signal; generating a modulated light emitting diode (LED) transmission signal, via a vehicle LED driver assembly; transmitting a plurality of light beams based at least in part on the generated modulated LED transmission signal; capturing a reflection of the plurality of light beams off the one or more objects, utilizing one or more lens assemblies and a camera, the camera including an array of pixel sensors and being positioned on the vehicle; communicating a series of measurements representing the captured plurality of light beam reflections; calculating, utilizing the time-of-flight sensor module, time of flight measurements between the vehicle LED light assembly and the one or more objects and calculating distances, utilizing a depth processor module, between the vehicle LED light assembly and the one or more objects based on the time-of-flight measurements.

19 Claims, 7 Drawing Sheets

Related U.S. Application Data continuation of application No. 18/197,798, filed on May 16, 2023, now Pat. No. 11,927,673.

(51) Int. Cl.
  *G01S 17/894* (2020.01)
  *G06T 7/50* (2017.01)
  *G06T 17/05* (2011.01)

(56) References Cited

U.S. PATENT DOCUMENTS

| | | | | |
|---|---|---|---|---|
| 11,329,728 | B1* | 5/2022 | Adams | H04B 10/532 |
| 11,800,261 | B1* | 10/2023 | Rofougaran | H04B 10/114 |
| 11,927,673 | B1* | 3/2024 | Jalali | G01S 17/894 |
| 12,066,547 | B1* | 8/2024 | Jalali | G01S 17/10 |
| 2015/0334318 | A1* | 11/2015 | Georgiev | H04N 23/56 |
| | | | | 348/46 |
| 2016/0086318 | A1* | 3/2016 | Hannuksela | G06T 5/50 |
| | | | | 348/43 |
| 2020/0119811 | A1* | 4/2020 | Kay | H04B 7/2041 |
| 2020/0158834 | A1* | 5/2020 | Han | G01S 7/4865 |
| 2020/0284883 | A1* | 9/2020 | Ferreira | H04N 25/773 |
| 2020/0309911 | A1* | 10/2020 | Meissner | G01S 7/4861 |
| 2020/0326704 | A1* | 10/2020 | Blanco | G05D 1/0088 |
| 2021/0112647 | A1* | 4/2021 | Coleman | H05B 45/12 |
| 2021/0194583 | A1* | 6/2021 | Maho | H04B 10/1123 |
| 2021/0341583 | A1* | 11/2021 | Adams | B60R 16/02 |

* cited by examiner

Simple diagram of time flight measurement.

METHOD AND SYSTEM FOR VEHICULAR LIDAR AND COMMUNICATION UTILIZING A VEHICLE HEAD LIGHT AND/OR TAILLIGHT AND COMMUNICATING WITH VEHICLE SUBSYSTEMS

CROSS-REFERENCE TO RELATED APPLICATIONS/INCORPORATION BY REFERENCE

This application is a continuation of and claims priority to U.S. Non-provisional patent application Ser. No. 18/596,256, filed Mar. 5, 2024, entitled "Method and System for Vehicle Lidar and Communication Utilizing a Vehicle Head Light and/or Taillight and Communicating with Vehicle Subsystems," now U.S. Pat. No. 12,066,547, which is a continuation and claims priority to U.S. Non-Provisional patent application Ser. No. 18/197,798, filed May 16, 2023 and entitled "Method and System for Vehicular LIDAR and Communication Utilizing a Vehicle Head Light and/or Taillight," the disclosures of which are all hereby incorporated by reference.

FIELD OF TECHNOLOGY

Certain embodiments of the disclosure relate to a vehicle light detection and ranging (LIDAR) system and other embodiments relate to a vehicle communication system. More specifically, certain embodiments of the disclosure relate to a vehicle lidar system utilizing a light emitting diode (LED) light assembly and certain embodiments of the disclosure relate to a vehicle communication system utilizing a LED light assembly in an outdoor environment.

BACKGROUND

Driver assistance and autonomous driving systems require a three-dimensional ("3D") camera, known as light detection and ranging ("lidar"), that senses the distance (range) to objects in front of the car. Most of the existing laser-based lidar techniques employ laser scanning of a targeted object and measure a range by pulsed time-of-flight (TOF) measurements—i.e., the time it takes each laser pulse to hit the target and return to a sensor. An autonomous driving system may also use another technique that scans a targeted object using a frequency swept (FMCW) laser followed by coherent detection, similar to a radio frequency FMCW radar. Currently, both of these techniques are too costly for the automotive or moving vehicle industry.

A driver assistance and autonomous driving system may also use an alternative 3D imaging technique named flash lidar. In flash lidar, an entire field of view is illuminated with a wide diverging optical beam in a single pulse. This is in contrast to conventional scanning lidar, which uses a collimated laser beam that illuminates a single point at a time and the collimated laser beam is raster scanned to illuminate a field of view point-by-point. In these environments, the depth information is collected using a time of flight (TOF) of the laser pulse which requires a pulsing of the laser and acquisition by a camera, where the laser and camera are to be synchronized. By measuring the time of flight at every pixel of the camera, a 3D image of the target object is formed. However, because the energy of the laser is spread over an entire field of view, an illumination power and also a sensitivity is reduced. To compensate for this in flash lidar, a laser must be high power which increases the cost and also creates eye safety problems.

Further limitations and disadvantages of conventional and traditional approaches will become apparent to one of skill in the art, through comparison of such systems with some aspects of the present disclosure as set forth in the remainder of the present application with reference to the drawings. A need exists for a low cost system that utilizes existing vehicle components for both a LIDAR system and a communication system.

BRIEF SUMMARY OF THE DISCLOSURE

A light detection and ranging (lidar) system and method utilizing a vehicle's existing, i.e., native LED light assembly to determine distances between a vehicle and one or more objects and providing the acquired information to the vehicle's self-driving or driver-assist system, substantially as shown in and/or described in connection with at least one of the figures, as set forth more completely in the claims. A communication system and method utilizing a vehicle's existing, i.e., native LED light assembly to communicate between a first vehicle and a second vehicle, without relying on a cellular network, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1:
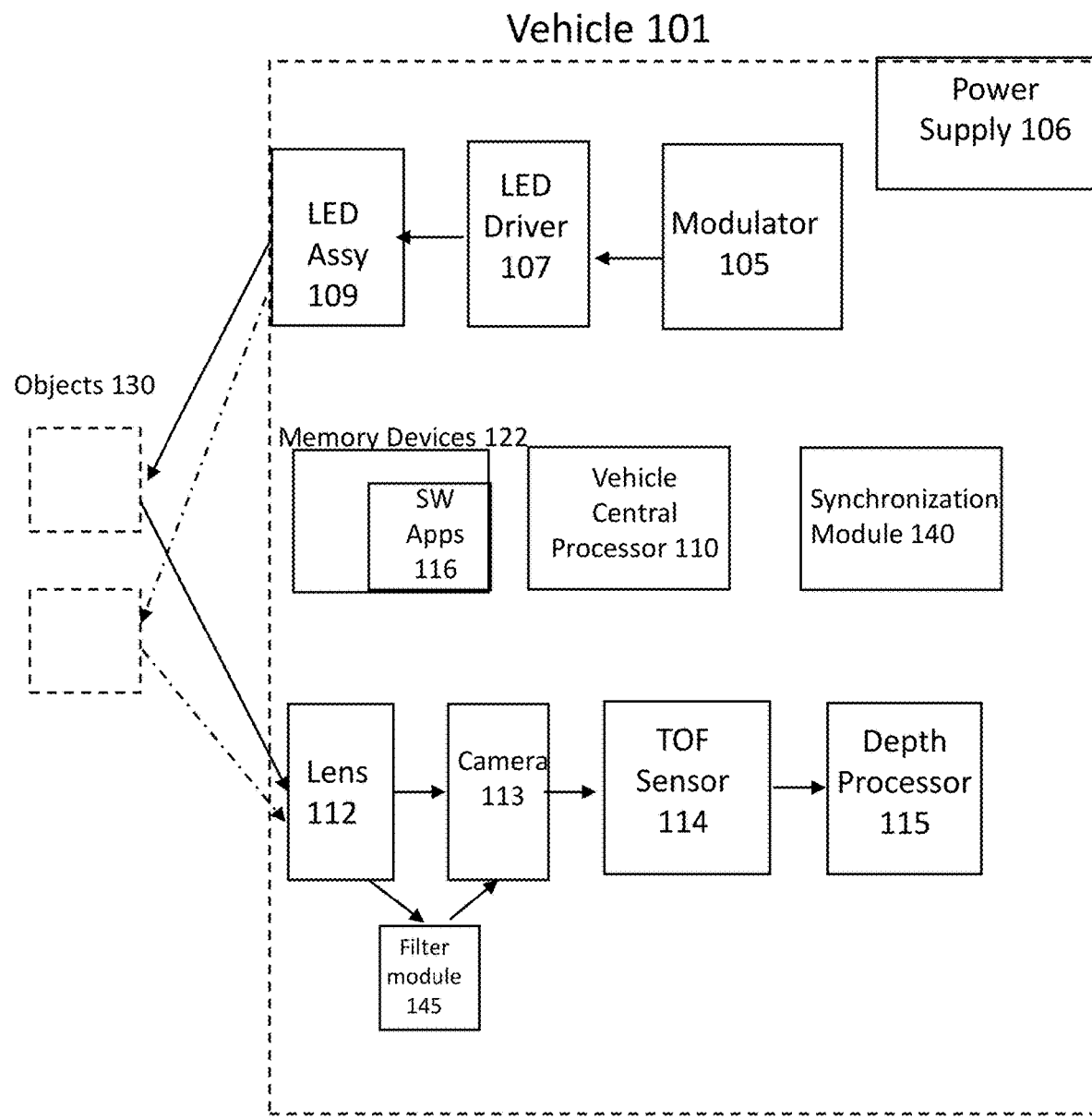
FIG. 1 is a block diagram that illustrates various components of an exemplary vehicle light detection and ranging (LIDAR) system, in accordance with en exemplary embodiment of the disclosure.

The following detailed description provides a better understanding of the features and advantages of the inventions described in the present disclosure in accordance with the embodiments disclosed herein. The following detailed description describes a method and system that utilizes a vehicle LED light assembly in a LIDAR system and a vehicle LED light assembly to communicate between a first vehicle and a second vehicle.

The subject matter disclosed herein is a vehicle three-dimensional (3D) imaging system that utilizes a vehicle's headlight or taillight to achieve ranging, (i.e. the measurement of a distance from vehicles to objects. Applications that may utilize the subject matter described herein may include, but are not limited to transportation and/or robotics. The subject matter described herein reduces a cost of a vehicle LIDAR system by utilizing many existing aspects and/or components of a vehicle, by eliminating the need for a laser for illumination of the scene and eliminating the need for laser scanning. The subject matter described herein exploits and utilizes the LED light assemblies in the vehicle (e.g., LED headlights and taillights) present in modern day vehicles. The present invention exploits the fact that, unlike the old gas-discharge headlights (e.g., halogen lights), LEDs may be modulated at high frequencies. This property of LED allows the LED light assemblies to be used as a light source and a camera (with an array of pixel sensors) to be utilized as a detector for a reflected plurality of modulated light beams which may be utilized by a time-of-flight module for calculating a range or distance from the measured object(s) to the vehicle. It is understood that the fundamental maximum modulation speed of an LED is limited by the spontaneous emission lifetime in the semiconductor or the capacitance of the LED, including the capacitance of the electrodes and the wiring. In these implementations, the LED assembly wiring may be modified to get a benefit of modulating the LEDs at a higher frequency or speed.

The low coherence of the LED light assemblies (compared to a high coherence of a laser assembly) is not a problem with the systems and methods described herein because time of flight measurements are based on direct measurement of light power in the reflected plurality of light beams and not the light beams' electric field. Further, the taillight may also be utilized as a light source with the subject matter disclosed herein because the range or distance measurement is based on the time of arrival of the intensity of the reflected light beams and not a color of the light. Accordingly, a red color of the rear lights does not impact an accuracy of the range measurement. Nevertheless, a color filter may be used before the detector in the receiver to filter out unwanted light from entering the receiver.

In the following description, reference is made to the accompanying drawings, which form a part hereof, and in which is shown, by way of illustration, various embodiments of the present disclosure.

FIG. 1 is a block diagram that illustrates various components of an exemplary vehicle light detection and ranging (LIDAR) system, in accordance with en exemplary embodiment of the disclosure. With reference to FIG. 1, there is shown a vehicle LIDAR system 100 in a vehicle 101 which may include one or more power supplies 106, one or more signal modulators 105, one or more light-emitting diode (LED) drivers 107, one or more LED light assemblies 10109, a vehicle central processor 110, one or more lenses or lens assemblies 112, one or more cameras 113 including arrays of pixel sensors, one or more time-of-flight (TOF) sensor modules 114, one or more depth processors 115, one or more additional vehicle processors (not shown) one or more software applications 116, one or more memory devices 122 and/or one or more vehicle subsystems (which are described in detail with respect to FIG. 4). In some implementations, the vehicle LIDAR system 100 may further include a synchronization module 140 and/or a filter module 145.

In exemplary embodiments, a vehicle 101 may be an automobile, a truck, an agricultural vehicle (tractor) including a light assembly, an electric bicycle including a light assembly, an auto terrain vehicle (ATV) including a light assembly, a motorcycle including a light assembly, an airplane, a golf cart including a light assembly, a robot or autonomous delivery vehicle including a light assembly or a moving vehicle including a light assembly. Any device that moves and includes a light assembly may also be referred to as a vehicle.

In exemplary embodiments, the vehicle 101 may include one or more power supplies 106. The one or more power supplies 106 may be one or more batteries. In some embodiments, the one or more batteries may be charged via electric vehicle charging systems if a vehicle is all electric. In some embodiments, the one or more batteries may be powered utilizing a gas combustion engine system. In some implementations, the one or more batteries may be powered utilizing a hydrogen gas combustion system. In exemplary embodiments, the one or more power supplies 106 may be coupled or connected to other electrical components in the vehicle 101 and/or electrical or electromechanical subsystems.

In exemplary embodiments, the vehicle LIDAR system may include one or more signal modulators 105. In some implementations, the one or more signal modulators 105 may utilize pulse modulation, or alternatively, may utilize sinusoidal modulation. In some implementations, the one or more signal modulators 105 may generate modulation signals having a frequency ranging from 100 Megahertz to 300 Megahertz. In alternative implementations, the one or more signal modulators 105 may generate modulation signals having a frequency ranging from 75 Megahertz to 600 Megahertz. It is understood that the fundamental maximum modulation speed of an LED is limited by the spontaneous emission lifetime in the semiconductor. The maximum speed may be further restricted by the capacitance of the LED, including the capacitance of the electrodes and the wiring. In this context, certain analog circuit techniques, such as pre-emphasis or RF peaking techniques, may be used to extend the LED bandwidth and hence increase its modulation speed.

In exemplary embodiments, the one or more signal modulators 106 may be coupled or connected to the one or more LED driver assemblies 107. The one or more LED driver assemblies 107 may generate a modulated LED transmission signal based at least on part on the modulation signal. In some implementations, the one or more LED driver assemblies 107 may be integrated circuits manufactured by Texas Instruments, ST, Infineon, and ON Semiconductor.

In exemplary embodiments, the vehicle LED light assembly 109 may be communicatively coupled or connected to the LED driver assembly 107. In exemplary embodiments, the LED light assembly 109 may transmit or generate a plurality of light beams. The plurality of light beams may be based at least on the generated modulated LED transmission signal. The vehicle LED light assembly 109 may be a vehicle headlight, or alternatively, may be a vehicle taillight. In implementations, the vehicle LED light assembly 109 may include multiple LED lights. In some implementations, the vehicle LED light assembly may be a LED headlight, a LED taillight, a LED light assembly installed on a front portion of a vehicle or a LED light assembly installed on a rear portion of a vehicle. Utilizing an existing vehicle LED light assembly 109 for a vehicle LIDAR system and eliminating the laser scanning decreases overall cost for the LIDAR system. In the subject matter described herein, the elimination of a laser also reduces an amount of power that the vehicle 101 may expend in determining a distance between a vehicle and/or one or more objects.

In exemplary embodiments, one or more objects 130 may be located in an outdoor environment with a vehicle 101 and in other exemplary embodiments, the one vehicle 101 and the one or more objects 130 may be located in an indoor environment, or alternatively, in an outdoor environment. The automotive lidar system 100 may be utilized to determine distances between the one or more objects 130 and the vehicle 101. In some implementations, the one or more plurality of light beams may reflect off of the one or more objects 130 and may create a plurality of reflected light beams. In some implementations, the plurality of reflected light beams may be captured or received by one or more cameras located or installed on the vehicle. The one or more objects 130 may be people, animals, furniture, buildings, or parked vehicles. The generation of the reflected plurality of light beams may occur continuously as well as the one or more cameras may receive and/or capture the reflected plurality of light beams continuously.

In exemplary embodiments, the plurality of reflected light beams may pass through one or more lens assemblies 112 installed in the vehicle. In some implementation, the one or more lens assemblies 112 may focus the plurality of reflected light beams onto an array of pixel sensors in the one or more cameras 113.

In exemplary embodiments, the one or more lens assemblies 112 may be in front on the one or more cameras 113 on the vehicle and/or may be communicatively coupled or connected to the one or more cameras 113. In exemplary embodiments, after passing through the one or more lens assemblies 112, the plurality of reflected light beams may be captured by the one or more cameras 113 positioned on the vehicle. In some implementations, the one or more cameras 113 in the vehicle may include respective one or more arrays of pixel sensors. The array of pixel sensors of the cameras 113 may capture the plurality of reflected light beams and may generate a plurality of measurements representing the captured intensity of a plurality of reflected light beams. In some implementations, the camera including the array of sensor pixels may be an Analog Devices ADSD3100 integrated circuit, although other cameras may be utilized. In some implementations, the camera including the array of sensor pixel may be a three-dimensional camera, or alternatively, a two-dimensional camera. In some implementations, a number of the components, e.g., the one or more lens assemblies 112, the camera including one or more arrays of pixel sensors 113, the vehicle LED assembly 109, and/or the vehicle LED driver assembly 107 may all be located or part of a single chipset. This reduces size and space requirements in the vehicle.

Figure 2:
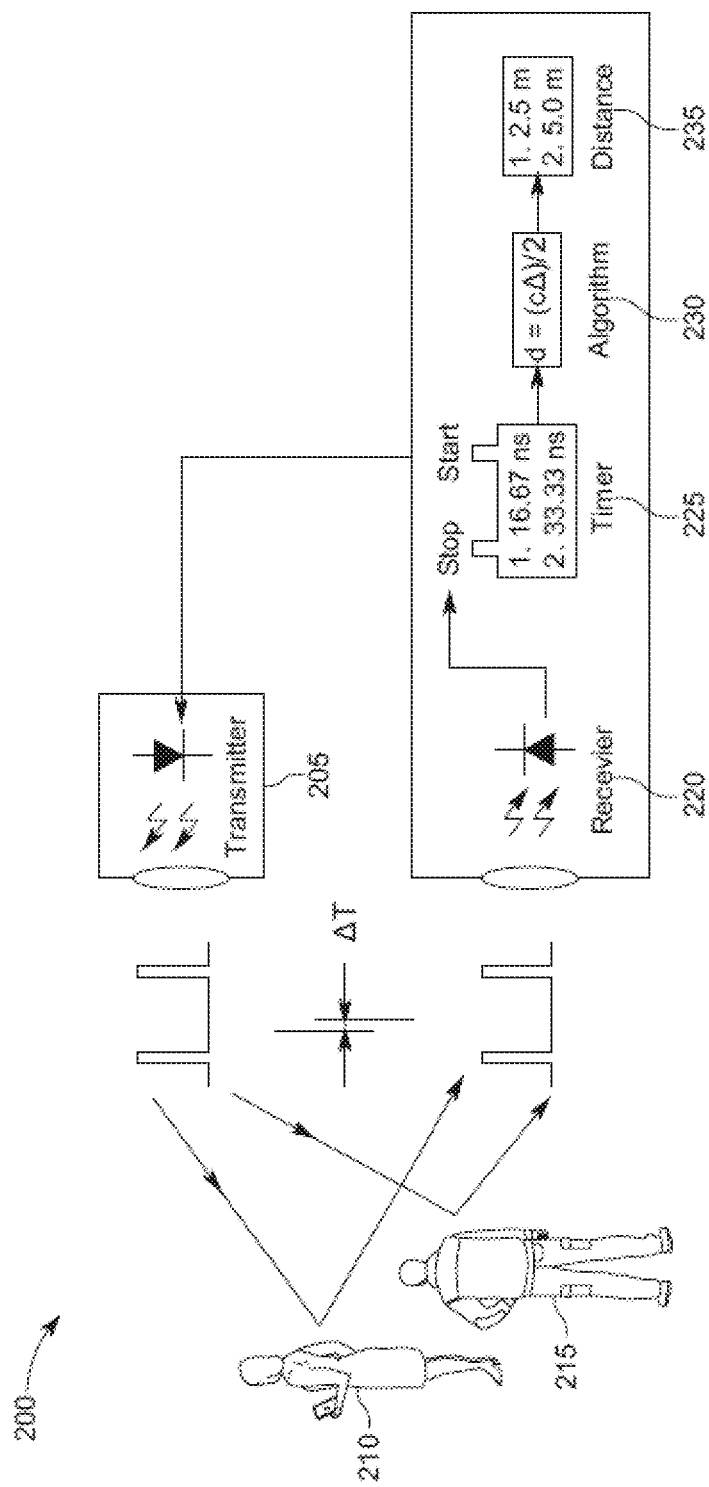
FIG. 2 is a block diagram illustrating calculation of time-of-flight measurements in accordance an exemplary embodiment of the disclosure.

In exemplary embodiments, the one or more cameras 113 may be communicatively coupled or connected to a time-of-flight sensor module 114. In some implementations, the one or more cameras 113 may communicate the generated plurality of measurements to the time-of-flight sensor module 114. The time-of-flight sensor module 114 may calculate a plurality of time-of-flight (TOF) measurements between the vehicle 101 and the one or more objects 130. FIG. 2 illustrates calculation of TOF measurements between a vehicle and two objects according to exemplary embodiments.

FIG. 2 is a block diagram illustrating calculation of time-of-flight measurements in accordance an exemplary embodiment of the disclosure. A TOF system 200 includes a vehicle LED transmitter or lighting assembly 205, one object (a person) 210, a second object 215 (a person), a vehicle camera 220, a vehicle timing subsystem 225, and/or software 230 for calculating a distance between the vehicle LED transmitter or lighting assembly 205 and the plurality of objects 210 and 215 (people 210 and 215). In some implementations, the vehicle LED transmitter or lighting assembly 205 transmits a plurality of modulated light beams towards the first object 210 and the second object 215. A plurality of reflected light beams may bounce off of the first object 210 and the second object 215 or be reflected from the first object 210 and the second object 215. In some implementations, a camera including an array of sensor pixels or a receiver 220 may capture the reflected light beams and may generate light intensity measurements based on the captured reflected light beams. A time-of-flight module including a timer 225 may receive the generated light intensity measurements and may generate a time between pulses of the transmitted plurality of modulated light beams and the captured reflected light beams for the first object 210 and the second object 215. In some implementations, the time-of-flight module measures the time delay A between when the light is emitted or transmitted from the vehicle LED light assembly 205 and when the reflected light is received by the camera including an array of sensor pixels 220. The time delay is proportional to twice the distance between the camera 220 and the first object 210 and the second object 215, therefore the distance can be estimated as depth=$c\Delta/2$ where c is the speed of light. As an illustrated example as shown in FIG. 2, the time-of-flight module including a timer 225 may generate a time of 16.67 nanoseconds between pulses with respect to the first person (object) 210 or may generate a time of 33.33 nanoseconds between pulses with respect to the second person (object) 215. The depth processor module including a distance generation algorithm 230 may calculate a distance between the first person (object) 210 and a vehicle LED light assembly 205 of 2.5 meters (reference number 235) and a distance between the second person (object) 215 and a vehicle LED light assembly 205 of 5.0 meters (reference number 235).

In exemplary embodiments, a depth processor or depth processor module 115 may be communicatively coupled or connected to the TOF sensor module 114. The depth processor or depth processor module 115 may receive the plurality of TOF measurements from the TOF sensor module 114. The depth processor or depth processor module 115 may calculate a plurality of distances between a vehicle and a plurality of objects. In some implementations, the plurality of distances may be stored in one or more memory devices 122 in the vehicle. In other implementations, the distance maybe encoded into color with the image shown on a monitor inside the vehicle.

In exemplary embodiments, a vehicle central processor 110 may be communicatively coupled to one or more memory devices 122 and/or a depth processor or depth processor module 115. In some implementations, the vehicle central processor 110 may retrieve the plurality of distances from the one or more memory devices 122 and may communicate the plurality of distances to other vehicle subsystems (e.g., a vehicle navigation subsystem system, a vehicle braking subsystem, a vehicle transmission subsystem, a vehicle steering system, a vehicle audio system or a vehicle display subsystem, which are described in detail below) in order for the other vehicle subsystems to utilize the plurality of distances in operation of these subsystems. In some implementations, the vehicle central processor 110 may communicate with the depth processor or depth processor module 115 to instruct the depth processor or depth processor module 115 to communicate the plurality of distance measurements to one or more of the other vehicle subsystems.

The vehicle central processor 110 may include suitable logic, circuitry, and/or interfaces configured to control various components in the vehicle LIDAR system and/or the vehicle central processor 110 may execute instructions stored in the one or more memory devices 122. Example of the implementation of the vehicle central processor 110 may include, but are not limited to an embedded processor, a field-programmable gate array (FPGA), a microcontroller, a specialized DSP, an Application-Specific Integrated Circuit (ASIC) processor, a Graphics Processor Unit (GPU) and/or other processors.

In exemplary embodiments, in order to continuously monitor a distance between the one or more objects and/or the vehicle, the system and/or device described above will continuously operate while the vehicle is powered on.

In exemplary embodiments, one or more software application programming interfaces (APIs) 116 may be stored in one or more memory devices 122. In some implementations, one or more software APIs 116 may be executable by the vehicle central processor 110 in order to communicate with the one or more other vehicle subsystems.

The one or more memory devices 122 may include suitable logic, circuitry, and/or interfaces that may be configured to store computer-readable instructions executable by the vehicle central processor 110. Examples of implementation of the one or more memory devices 122 may include, but are not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. It is to be understood by a person having ordinary skill in the art that a memory controller may control operation of the one or more memory devices 122 and may further include one or more other components, such as an analog to digital converter (ADC), a digital to analog (DAC) converter, a cellular modem, and the like, known in the art, which are omitted for brevity.

Figure 4:
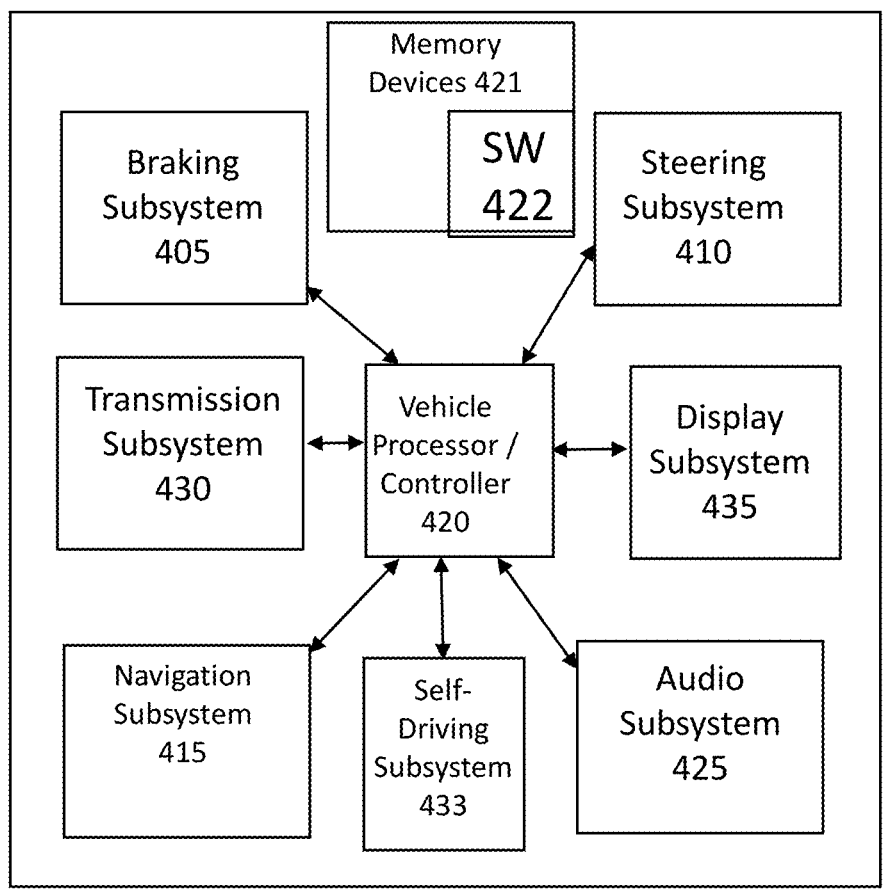
FIG. 4 is a block diagram of a vehicle processor and a plurality of vehicle subsystems, in accordance with an embodiment of the disclosure.

In exemplary embodiments, various components (e.g., the depth processor 115, the TOF sensor 114, the camera 113, the signal modulator 105, the LED Driver 107 and/or the LED assembly 109 may utilize a number of different communication protocols when communicating with the vehicle central processor 110. These communication protocols may include the Mobile Industry Protocol Interface (MIPI), the Serial Peripheral Interface (SPI) and/or the Inter-Integrated Circuit interface (I2C). In exemplary embodiments, the vehicle central processor 110 described above may communicate with communicate with various other subsystems utilizing a Controller Area Network bus (CANbus). Communication may occur utilizing a Controller Area Network (CAN) protocol. In some implementations, the vehicle may include a number of subsystems (e.g., as illustrated in FIG. 4 and described below) including, but not limited to, a vehicle braking subsystem 405, a vehicle transmission subsystem 430, a vehicle steering subsystem 410, a vehicle audio subsystem 425, and a vehicle display subsystem 435. In some implementations, a vehicle central processor 110 may communicate with the subsystems over a CANbus utilizing a CAN protocol. The subsystems may also be referred to as electronic control units (ECUs). In some implementations, the ECUs may have sensors and switches wired in to detect variables such as temperature, pressure, voltage, acceleration at different angles, braking, yaw and roll of the vehicle, steering angle, and many other signals. When an ECU needs a signal from a sensor connected to an ECU elsewhere in the car, the ECUs or subsystems may communicate utilizing the CANbus.

Current vehicle-to-vehicle technologies include Cellular V2X (C-V2X), which is a 3GPP standard for self-driving cars, and Dedicated Short Range Communications (DSRC), which warns drivers of an impending dangerous condition or event in time to take corrective or evasive actions. C-V2X and DSRC are both wireless-based and require a communication infrastructure or network to be in place. However, the subject matter described herein does not require a wireless network or communication interface and includes direct communication between the vehicles. The subject matter described herein can operate in all environmental conditions. In addition, the subject matter described herein is low latency compared to the current wireless vehicle-to-vehicle technologies due to the directness of the communication along with speed of light transmission. This is a significant benefit over the current vehicle-to-vehicle technologies and is vital with respect to self-driving cars and/or car safety where speed of communication between vehicles is imperative. Another application of the subject-matter described herein is the ability to have covert communications between two or more vehicles that other drivers cannot intercept and would be unaware is even occurring.

In exemplary embodiments, a braking software API may be executable by the vehicle central processor 110 to communicate with the vehicle braking subsystem 405. In some implementations, the vehicle central processor 110 may utilize the vehicle braking subsystem 405 to instruct the vehicle braking subsystem 405 to activate or deactivate. As an example, the vehicle central processor 110 may determine, if any of the received distance measurements are too close to the vehicle, to instruct the braking subsystem 405 to activate in order to apply one or more brakes to stop the vehicle or decrease the vehicle's speed.

In exemplary embodiments, a vehicle transmission system API may be executable by the vehicle central processor 110 to communicate with the vehicle transmission subsystem 430. In some implementations, the vehicle central processor 110 may utilize the vehicle transmission subsystem 430 to instruct the vehicle transmission subsystem 430 to move or not move to a specific gear (e.g., drive, reverse, neutral). As an illustrative example, the vehicle central processor 110 may determine, if any of the received plurality of distance measurements are too close to the vehicle, to instruct to vehicle transmission subsystem 430 to move a transmission or gearing assembly to drive or reverse in order to keep the vehicle from hitting another or coming closer to one or more objects.

In exemplary embodiments, a steering API may be executable by the vehicle central processor 110 to communicate with the vehicle steering subsystem 410. In some implementations, the vehicle central processor 110 may utilize the steering API to instruct the vehicle steering subsystem 410 to turn the vehicle in a specific direction. As an example, the vehicle central processor 110 may determine, if the plurality of received distance measurements identify one or more objects are on the right, to instruct the vehicle steering subsystem 410 to turn the vehicle to the left in order to move away from the detected one or more objects.

In exemplary embodiments, an audio software API may be executable by the vehicle central processor 110 to communicate with the vehicle audio subsystem 425. In some implementations, the vehicle central processor 110 may utilize the audio software API to instruct the vehicle audio subsystem 425 to create sounds. As an example, the vehicle central processor 110 may determine, if any of the received distance measurements are too close to the vehicle, to instruct the vehicle audio subsystem 425 to speak a message in order to let a driver or passenger that the one or more objects is close and to adjust he to stop the vehicle or decrease the victim's speed.

In exemplary embodiments, a display software API may be executable by the vehicle central processor 110 to communicate with the vehicle display subsystem 435. In some implementations, the vehicle central processor 110 may utilize the display software API to instruct the vehicle display subsystem 435 to display a message or an image. As an example, the vehicle central processor 110 may determine, if any of the received distance measurements are too close to the vehicle, to instruct the vehicle display subsystem 435 to display a message that the one or more objects are too close and/or to display an image showing a location of the one or more objects in order to make the driver aware of the one or objects.

In exemplary embodiments, the vehicle LIDAR system 100 may include a synchronization module 140. The synchronization module 140 may be implemented in software, hardware and/or a combination thereof. In some implementations, a synchronization module 140 may be configured to synchronize the camera 113 and the modulation signal from the signal modulator 105. In some implementations, the signal modulator 105 and/or the camera 113 may utilize code division multiple access (CDMA) protocols. The signal modulator 105 may, using CDMA protocols, assign the modulation signal a specific code. The camera module 113 (including the array of pixel sensors) may be configured to capture the plurality of reflected light beams that include the assigned specific code. The other reflected light beams that do not include the specific code may be discarded and not utilized. This will allow stray light from other light sources such as other automobiles, street lights, natural light sources like the moon and the sun, for example, that may be picked up by the camera module 113 to not be utilized in determining the time-of-flight measurements. In other words, utilizing CDMA filtering and protocols allows the vehicle lidar system 101 to filter out and utilize only the plurality of reflected light beams that are transmitted by the vehicles LED light assemblies. This improves an accuracy of the vehicle LIDAR system 100.

In exemplary embodiments, the vehicle LIDAR system 100 may further include an optical filter module 145. The filter module 145 may be coupled or connected to the one or more cameras including arrays of pixel sensors 113. In some implementations, the signal modulator 105 may utilize one single frequency or a specific number of single frequencies when generating the modulation signal. The filter module 145 may receive the plurality of reflected light beams and may filter out any of the plurality of reflected light beams whose frequency is not the single frequency (or the other number of single frequencies). This also allows the vehicle lidar system 101 to filter out and only use the plurality of reflected light beams that are transmitted by the vehicle LED light assembly 109. This also improves the accuracy of the vehicle LIDAR system 100.

Figure 3:
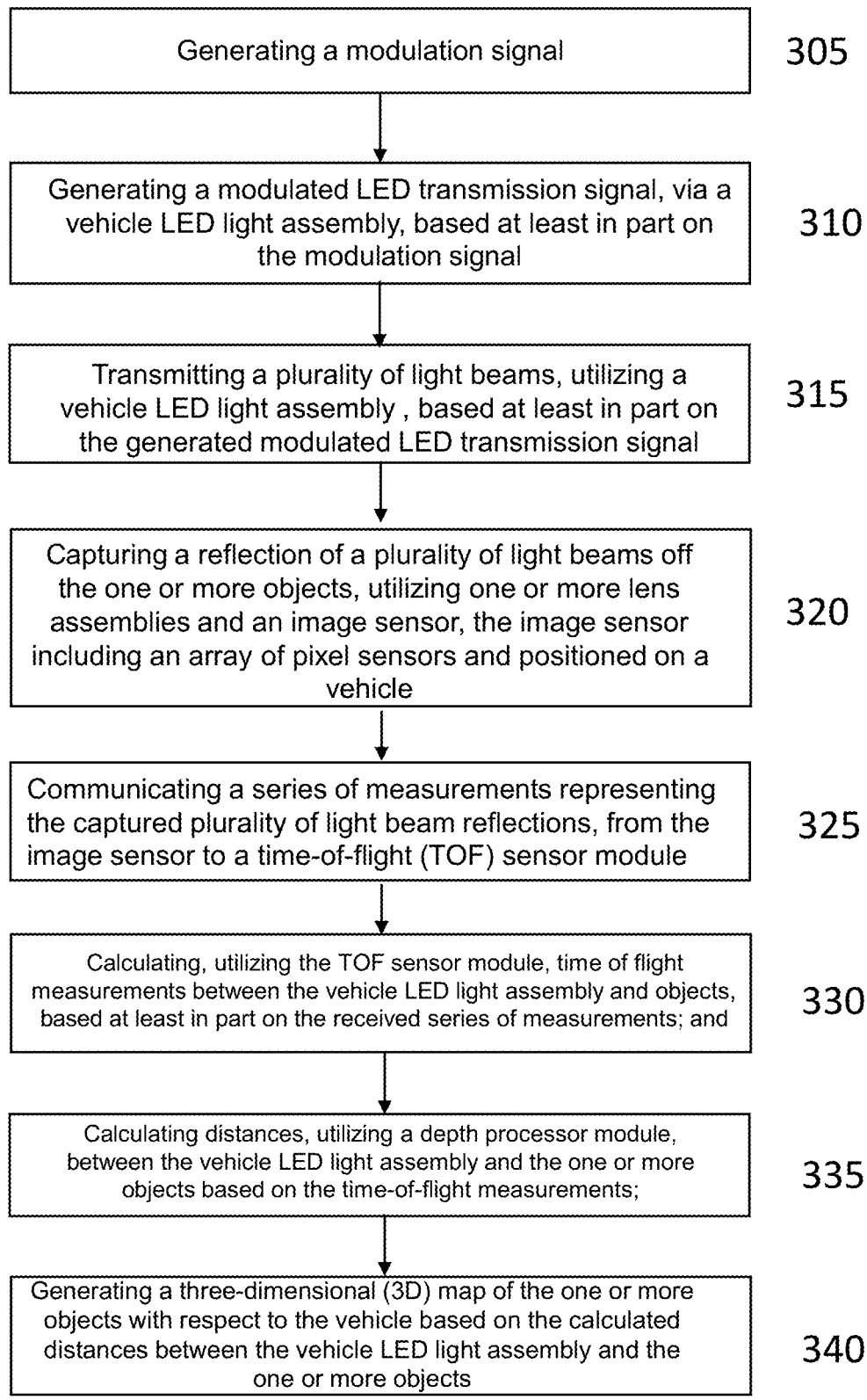
FIG. 3 is a flowchart that illustrates an exemplary method for utilizing a vehicle's LED light assembly-based LIDAR system to calculate distances between a vehicle and one or more objects, in accordance with an embodiment of the disclosure.

FIG. 3 is a flowchart that illustrates an exemplary method for operating a vehicle light emitting diode (LED) light assembly (e.g., a LED head light and tail light) for vehicular light detection and ranging (LIDAR), in accordance with an embodiment of the disclosure. FIG. 3 is explained in conjunction with elements from FIGS. 1 and 2. With reference to FIG. 3, there is shown a flowchart 300 comprising exemplary operations 305 through 340.

At 305, a modulation signal may be generated by a signal modulator 105. A LED driver assembly 107 may be configured to receive the modulation signal from the signal modulator 105.

At 310, a modulated LED transmission signal may be generated via the vehicle LED driver assembly 107 based at least in part on the modulation signal. The vehicle LED assembly 109 may be configured to receive the modulated LED transmission signal.

At 315, a plurality of modulated light beams may be generated via the vehicle LED light assembly 109, based at least in part on the modulated LED transmission signal. The plurality of modulated light beams may strike and/or be reflected off of a plurality of objects 130 that are located in an environment with a first vehicle 101.

At 320, a plurality of light beam reflections from one or more objects 130 may be captured utilizing an array of pixel sensors of a camera 113. In an exemplary embodiment, the plurality of light beam reflections may pass through one or more lens assemblies 112 before being captured by the array of pixel sensors 113.

At 325, a series of measurements representing an intensity of the captured plurality of light beam reflections, may be generated by the array of pixel sensors of the camera 113. In an exemplary embodiment, the generated series of measurements may be communicated to a time-of-flight sensor module 114, which may be configured to receive the generated series of measurements.

At 330, a plurality of time-of-flight (TOF) measurements may be calculated, utilizing the TOF sensor module, based at least in part on the series of measurements received from the array of pixel sensors representing the captured plurality of light beam reflections. In an exemplary embodiment, a depth processor 115 may be configured to receive the plurality of the TOF measurements from the TOF sensor module 114.

At 335, a plurality of distances may be calculated between a vehicle LED light assembly 109 (and thus the vehicle 101) and one or more objects 130 131, utilizing a depth processor module 115, based on the generated time-of-flight measurements. In an exemplary embodiment, a vehicle central processor 110 may be configured to receive the plurality of distances between the vehicle LED light assembly 109 and the one or more objects 130.

At 340, a vehicle central processor 110, may utilize a calculated one or more distances with a variety of different software applications in the vehicle and/or may store the calculated one or more distances in one or more memory devices 122 of a vehicle 100. In an exemplary embodiment, the vehicle central processor 110 may communicate the calculated one or more distances to various other components and/or subsystems in the first vehicle 100.

In some implementations, a vehicle central processor 110 may communicate the one or more distances to a vehicle navigation subsystem 415. As an illustrative example, a three-dimensional (3D) map may be generated utilizing the one or more distances between the one or more objects 130 with respect to the vehicle LED light assembly 109, In some implementations, a vehicle central processor 110 may communicate the one or more distances to a vehicle braking subsystem 405. The vehicle braking subsystem 405 may analyze the distances, and if the distances between the vehicle LED light assembly 109 and the one or more objects 130 are too small, the vehicle braking subsystem 405 may activate one or more vehicle brakes.

In some implementations, a vehicle central processor 110 may communicate the one or more distances to a vehicle drive or transmission subsystem 430. The vehicle transmission subsystem may analyze the received distances and if the distances between the vehicle LED light assembly 109 and the one or more objects 130 are too small, the vehicle transmission subsystem 430 may disengage the vehicle driving subsystem.

In some implementations, a vehicle central processor 110 may communicate the one or more distances or ranging measurements to a self-driving subsystem 433. The self-driving subsystem controls operations of the vehicle when the vehicle is driverless and thus operating autonomously. In some implementations, the self-driving subsystem 433 may receive the distances or ranging measurements, may analyze the distance or ranging measurements and may communicate instructions to other subsystems (vehicle navigation subsystem 415, vehicle braking subsystem 405, vehicle drive or transmission subsystem 430, vehicle display system 435 or vehicle audio system 425) to identify and control operations of the driverless vehicle. As an example, if distances or ranging measurements to the plurality of objects are too small, the self-driving subsystem 433 may communicate to the braking subsystem 405 that the brakes should be applied and/or may communicate to the vehicle display system 435 to display a warning.

In some implementations, a vehicle central processor 110 may communicate the one or more distances to a vehicle display system 435. The vehicle display system 435 may analyze the received distances and may generate a display object identifying specific distances between the vehicle LED light assembly 109 and the one or more objects or may generate an error message or error display object to warn a driver of a vehicle.

In some implementations, a vehicle central processor 110 may communicate the one or more distances to a vehicle audio system 425. The vehicle audio system 425 may analyze the received distances and may generate an audible sound alert identifying that one or more distances are too close and that a driver of a first vehicle 100 should take evasive measures in order to avoid the one or more objects.

FIG. 4 is a block diagram illustrating various components of an exemplary vehicle in accordance with an exemplary embodiment of the disclosure. FIG. 4 is explained in conjunction with elements from FIGS. 1-3 and 4-6. With reference to FIG. 4, there is shown a block diagram 400 of the vehicle main processor 420, one or more memory devices 421, computer-readable instructions 422 stored in the one or more memory devices 421, a braking subsystem 405, a steering subsystem 410, a navigation subsystem 415, an audio subsystem 425, a transmission subsystem 430, and/or a display subsystem 435. In some implementations, the computer-readable instructions stored in the one or more memory devices may be executable by the one or more vehicle processor controller 420 to communicate with the other vehicle subsystems in order to transmit and/or receive data and/or instructions from the other vehicle subsystems. As described above with respect to FIGS. 1-3, a plurality of distance and/or directional measurements may be received from the depth processor module 115. In these implementations, computer-readable instructions may be executable by the vehicle processor controller 420 to communicate the plurality of distance and/or directional measurements to the other vehicle subsystems. As described above with respect to FIGS. 4-6, the decoded one or more messages may be received from the decoder assembly or module 545 or 517. In these implementations, computer-readable instructions may be executable by the vehicle processor controller 420 to communicate the decoded one or more messages to the other vehicle subsystems.

Figure 5:
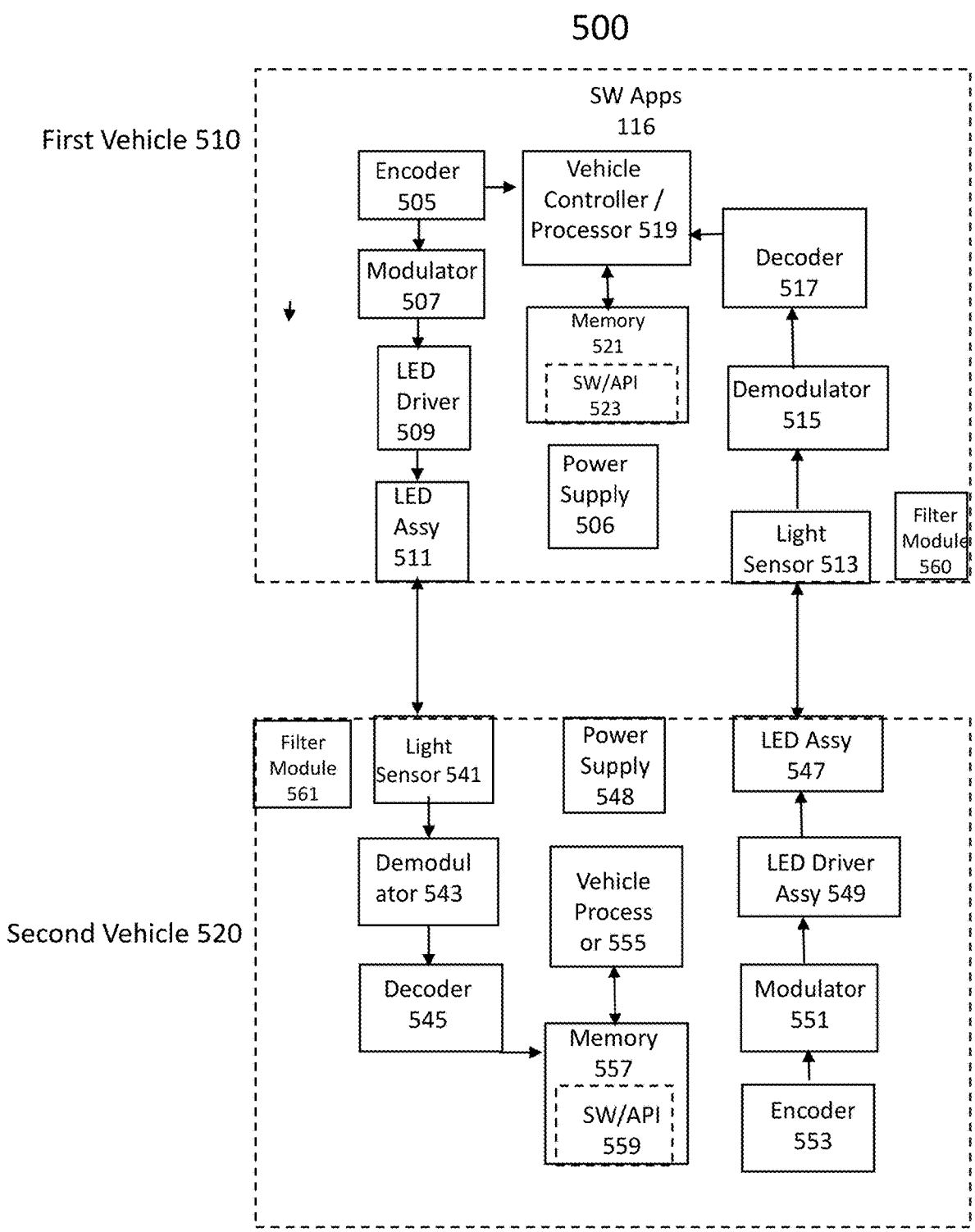
FIG. 5 is a block diagram that illustrates various components of an exemplary LED light communication system, in accordance with an exemplary embodiment of the disclosure.
Figure 6:
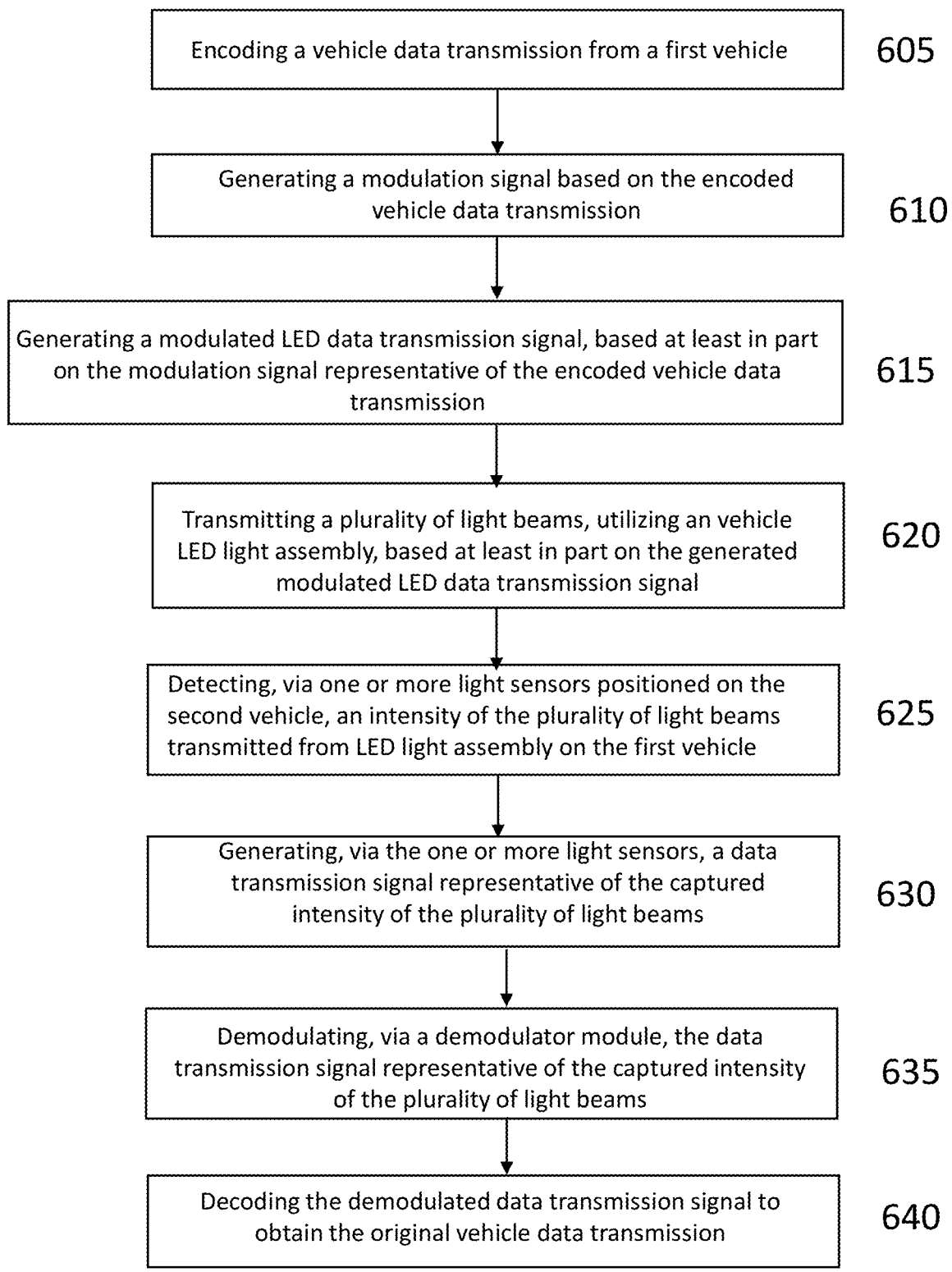
FIG. 6 is a flowchart that illustrates an exemplary method for utilizing a LED assembly to communicate between a first vehicle and a second vehicle, in accordance with an embodiment of the disclosure
Figure 7:
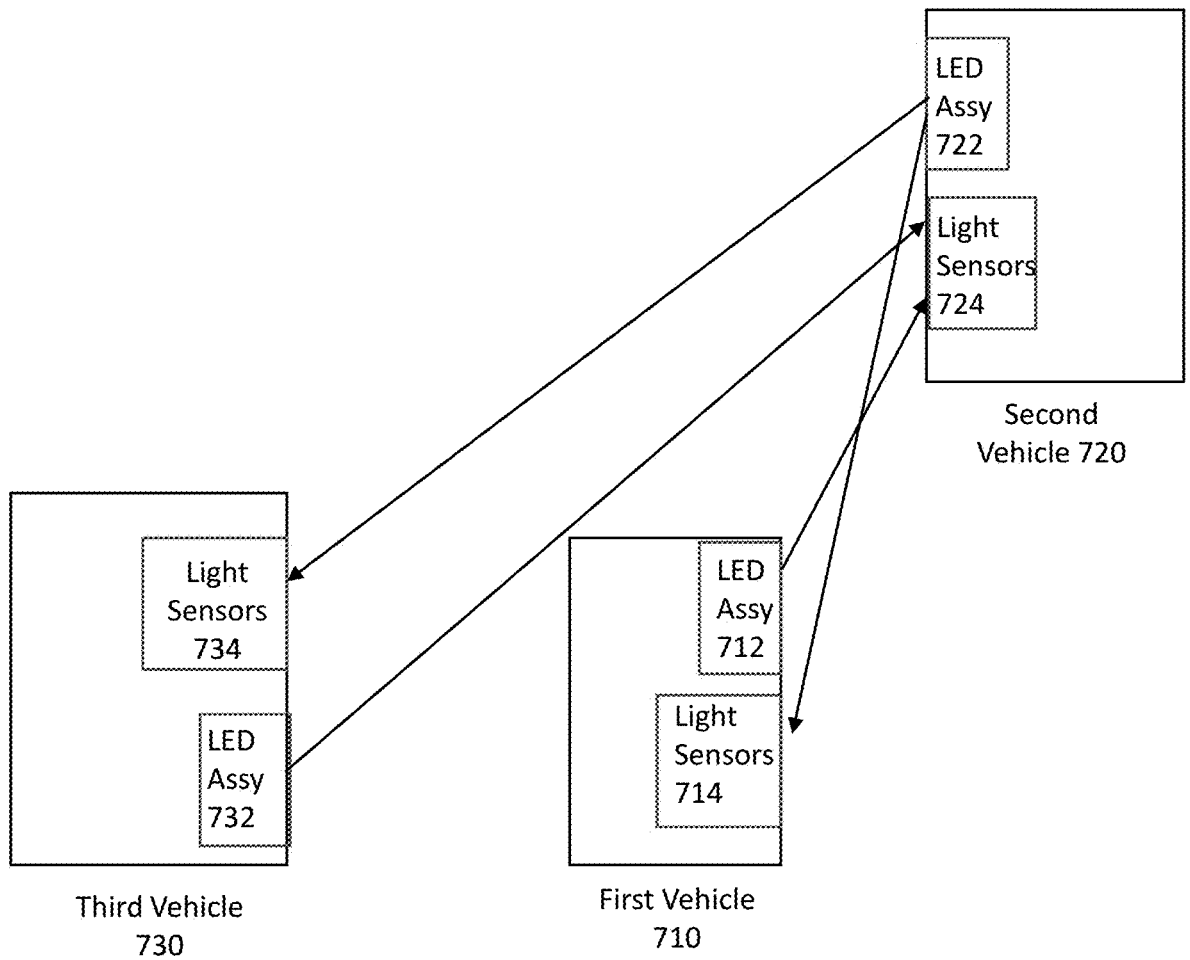
FIG. 7 illustrates a communication system between a first vehicle, a second vehicle and a third vehicle using a vehicle LED communication system according to some implementations.

For exemplary embodiments, the braking subsystem 405 may be communicatively coupled or connected to the vehicle processor controller 420. In some implementations, the braking subsystem 405 may be configured to control the brakes on all of wheels of the vehicle. The braking subsystem 405 may include memory devices, sensors, a controller and/or computer-readable instructions executable by the controller to receive instructions and perform operations identified by the instructions. In some implementations, the braking subsystem 405 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the steering subsystem 410 may be communicatively coupled or connected to the vehicle processor controller 420. In some implementations, the steering system may be configured to control the steering of the vehicle when in operation. The steering subsystem 410 may include memory devices, a controller, sensors, and/or computer-readable instructions executable by the controller to receive instructions and perform operations identified by the instructions. In some implementations, the steering subsystem 410 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the navigation subsystem 415 may be communicatively coupled or connected to the vehicle processor controller 420. In some implementations, the navigation subsystem 415 may be configured to provide directions to places of interest for the vehicle or driver or to provide the driver or vehicle with location information. The navigation subsystem 415 may include memory devices, sensors, a controller and/or computer-readable instructions executable by the controller to receive instructions and perform operations identified by the instructions. In some implementations, the navigation subsystem 415 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the audio subsystem 425 may be communicatively coupled or connected to the vehicle processor controller 420. In some implementations, the audio subsystem 425 may be configured to generate audible messages for drivers and/or passengers in the vehicle. The audio subsystem 425 may include memory devices, sensors, a controller and/or computer-readable instructions executable by the controller to receive instructions and perform operations identified by the instructions. In some implementations, the audio subsystem 425 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the self-driving subsystem 433 may be communicatively coupled or connected to the vehicle processor 420. In some implementations, the self-driving subsystem 433 may be configured to communicate and provide instructions to other subsystems in order for the vehicle to drive itself without human intervention. The self-driving subsystem 433 may include memory devices, sensors, a controller and/or computer-readable instructions executable by the controller to receive instructions and perform operations identified by the instructions. In some implementations, the self-driving subsystem 433 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the transmission subsystem 430 may be communicatively coupled or connected to the vehicle processor controller 420. In some implementations, the transmission subsystem 430 may be configured to control the gearing mechanisms in the vehicle in order to move the vehicle forward, backwards, etc. The transmission subsystem 430 may include memory devices, a controller, sensors, and/or computer-readable instructions executable by the controller to receive instructions and perform operations identified by the instructions. In some implementations, the transmission subsystem 430 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

For exemplary embodiments, the display subsystem 435 may be communicatively coupled or connected to the vehicle processor controller 420. In some implementations, the display subsystem 435 may be configured to provide a user with displays of operational conditions of the vehicle (e.g., speed, revolutions per hour, temperature in vehicle, air conditioning status) as well as to generate and display messages to drivers or passengers in the vehicle. The display subsystem 435 may include memory devices, sensors, a controller and/or computer-readable instructions executable by the controller to receive instructions and perform operations identified by the instructions. In some implementations, the display subsystem 435 may receive range and/or distance measurements or parameters from the vehicle lidar system 100 as illustrated in FIGS. 1-3 (and the associated description) or may communicate to or receive from one or more communication messages from other vehicles as described with respect to the LED vehicle communication system as illustrated in FIGS. 5-7 (and the associated description).

FIG. 5 is a block diagram illustrating different components of an exemplary LED vehicle communication system between a first vehicle and a second vehicle, in accordance with an embodiment of the disclosure. With reference to FIG. 5, there is shown a block diagram 500 of a first vehicle 510 communicating with a second vehicle 520. With reference to FIG. 5, a first vehicle 510 includes an encoder assembly 505, a signal modulator 507, a vehicle LED driver assembly 509, a vehicle LED assembly 511, a power supply 506, one or more vehicle light sensors 513, a signal demodulator 515, a decoder assembly 517, a vehicle central controller/processor 519, and/or one or more vehicle subsystem software (APIs) application programming interfaces 523.

With reference to FIG. 5, the second vehicle 520 may include one or more vehicle light sensors 541, a signal demodulator 543, a decoder assembly 545, a vehicle LED driver assembly 549, a vehicle LED assembly 547, a power supply 548, a signal modulator 551, an encoder assembly 553, a vehicle central controller/processor 555, one or more memory devices 557, and/or one or more vehicle subsystem software (APIs) application programming interfaces 559.

In exemplary embodiments, a first vehicle main controller processor 519 may execute computer-readable instructions stored in the one or more memory devices 521 to control operations of the illustrated components in the first vehicle 510. In order to initiate a communication from the first vehicle 510 to the second vehicle 520, the computer-readable instructions may communicate one or more messages to the encoder assembly 505 in the first vehicle.

In exemplary embodiments, the encoder assembly 505 may be communicatively coupled and connected to the vehicle controller/processor 519 and/or a signal modulator 507. In some implementations, the one or more messages may be encoded by the encoder assembly 505 and may be communicated to the signal modulator 507.

In exemplary embodiments, the encoded one or more messages may be modulated by a signal modulator 507 to generate one or more encoded modulated messages.

In exemplary embodiments, the signal modulator 507 may be communicatively coupled to the vehicle LED driver assembly 509. In some implementations, a modulated LED data transmission signal may be generated by the vehicle LED driver assembly 509 based at least in part on the one or more encoded modulated messages.

In exemplary embodiments, the vehicle LED assembly 511 is communicatively coupled or connected to the vehicle LED driver assembly 509. In some implementations, the vehicle LED assembly 511 in the first vehicle 510 may be configured to generate a plurality of modulated light beams based on the received modulated LED data transmission signal. The plurality of modulated light beams may be transmitted in an outward direction from the first vehicle 510. In some implementations, the vehicle LED assembly 511 may be a vehicle LED headlight and the plurality of modulated light beams may be transmitted in an outward direction from a front of a first vehicle 510. In alternative implementations, the vehicle LED assembly 511 may be a vehicle LED taillight in the first vehicle 510 and the plurality of modulated light beams may be transmitted in an outward direction from a rear of a first vehicle 510.

In exemplary embodiments, a second vehicle 520 may receive the plurality of modulated light beams from the first vehicle LED assembly 511. In some implementations, one or more light sensors 541 in the second vehicle may detect the plurality of modulated light beams. The one or more light sensors 541 may detect an intensity of the plurality of modulated light beams.

In exemplary embodiments, the one or more light sensors 541 of the second vehicle may be configured to generate a modulated data transmission signal representative of the captured intensity of the plurality of modulated light beams.

In exemplary embodiments, the signal demodulator 543 in the second vehicle 520 may be communicatively coupled or connected to the one or more light sensors 541. In some implementations, the signal demodulator 543 in the second vehicle may be configured to receive the modulated data transmission signal from the one or more light sensors 541 and may generate a demodulated data transmission signal. The signal demodulator 543 may transmit the demodulated data transmission signal to the decoder assembly 545.

In exemplary embodiments, the decoder assembly 545 in the second vehicle 520 may be communicatively coupled to the signal demodulator 543 and/or the second vehicle central processor 555. In some implementations, the decoder assembly 545 in the second vehicle 520 may receive the demodulated data transmission signal and may generate a decoded data transmission signal. The decoded data transmission signal should be the same as or similar to the original one or more messages generated by the first vehicle's controller and/or processor 519.

In exemplary embodiments, the decoder assembly 545 may be communicatively coupled to the one or more memory devices 557 and/or the second vehicle central processor or controller 555. In some implementations, the decoder assembly 545 may be configured to communicate the decoded data transmission signal to be stored in the one or more memory devices 521. In some implementations, the second vehicle central processor or controller 555 may be configured to communicate the decoded data transmission signal to other vehicle subassemblies (as described in FIG. 4) of the second vehicle in order for the other vehicle subassemblies to perform action in response to the received decoded data transmission signal. As an illustrative example, the first vehicle 510 may be going in the opposite direction from the second vehicle 520 and may communicate one or more messages via the LED headlight 511 identifying that an accident has occurred in an area that the first vehicle 510 recently passed. The second vehicle 520 may receive the decoded data transmission signal and may communicate the decoded data transmission signal to the vehicle display subsystem 435 in the second vehicle 520 to display a message identifying an accident is up ahead and/or a vehicle audio subsystem 425 to create an audible message or sound to warn a driver of the second vehicle 520 there is an accident up ahead.

In some implementations, communications may flow both ways between the first vehicle 510 and 520. In some implementations, a first vehicle LED headlight 511 may communicate one or more modulated messages via a plurality of light beams which may be received as described immediately above. As an illustrative example, a first vehicle LED headlight 511 may communicate a message from a vehicle braking subsystem 405 that a tire is flat or that brakes are failing in order to warn the second vehicle 520 (who is travelling the same direction and behind the first vehicle 510) that the brakes or tire has failed. In some implementations, the second vehicle 520 may generate one or more messages indicating receipt of the error message and asking the first vehicle 510 if the first vehicle 510 may need any assistance. This scenario may be described with respect to FIG. 5 below.

In this example, computer-readable instructions 559 may be accessed from the one or more memory devices 557 and may be executable by the second vehicle central processor or controller 555 to receive one or more messages from one or more of the other vehicle subsystems to verify receipt and also to ask if the first vehicle 510 needs more assistance. In some implementations, the encoder assembly 553 of the second vehicle 520 may encode the one or more verification and/or assistance messages and may communicate the one or more encoded verification and/or assistance messages to a signal modulator 551. In some implementations, the signal modulator 551 of the second vehicle 520 may modulate the one or more encoded verification and/or assistance messages and create one or more encoded modulated verification and/or assistance messages. The signal modulator 551 may be configured to communicate the encoded modulated verification messages to the LED driver assembly 549 in the second vehicle 520. The LED driver assembly 549 may be configured to generate a modulated LED transmission response signal based at least in part on the received one or more encoded modulated verification/assistance messages. The LED driver assembly 549 in the second vehicle may be configured to communicate the modulated LED transmission response signal to the vehicle LED assembly 547. The vehicle LED assembly 547 in the second vehicle 520 may be configured to generate and transmit a plurality of response light beams based at least in part on the modulated LED transmission response signal.

In exemplary embodiments, one or more light sensors 513 on first vehicle 510 may be configured to detect an intensity of the plurality of response light beams transmitted from the second vehicle LED assembly 547. In some implementations, the one or more light sensors 513 in the first vehicle may be configured to generate a response data transmission signal representative of the detected intensity of the plurality of response light beams. The one or more light sensors 513 in the first vehicle may communicate the response data transmission signal to the signal demodulator 515 in the first vehicle 510.

In exemplary embodiments, the signal demodulator 515 in the first vehicle 510 may be configured to generate a demodulated response data transmission signal and communicate the demodulated response data transmission signal to the decoder assembly 517 in the first vehicle 510. The decoder assembly 517 may decode the demodulated response data transmission signal to create one or more decoded response messages. In some implementations, the one or more decoded response messages may be stored in one or more memory devices 521 of the first vehicle 510. In some implementations, computer-readable instructions 523 may be executable by the vehicle controller/processor 519 to process the decoded response messages and to communicate these decoded messages to an appropriate vehicle subsystem for actions.

In exemplary embodiments, the vehicle communication system 500 may include a synchronization module within the encoder assemblies 505 553. The synchronization module in the encoder assemblies 505 553 may be implemented in software, hardware and/or a combination thereof. In some implementations, a synchronization module in the encoder assemblies 505 553 may be configured to synchronize the one or more light sensors 513 and 541 and the one or more encoded messages generated by the encoding assemblies 505 553. In some implementations, the encoder assemblies 505 553 may utilize a code division multiple access (CDMA) protocol for synchronization. As an example, encoder assemblies 505 553 may assign one or more encoded messages a specific code, utilizing CDMA protocols. The one or more light sensors 513 541 may be configured to capture the plurality of reflected light beams that include the assigned specific code. The other reflected light beams may be discarded and not utilized. Stray light from other light sources such as other automobiles, street lights, natural light sources like the moon and the sun, for example, may be picked up by the one or more light sensors 513 541. However, utilizing CDMA filtering and protocols allows the vehicle communication system to filter out and utilize only the plurality of reflected light beams that are transmitted by the vehicles LED light assemblies 511 and 547. This technique improves an accuracy of the vehicle LED communication system 500.

In exemplary embodiments, the vehicle communication system 500 may further include filter modules 560 561. The filter modules 560 561 may be coupled or connected to the one or more light sensors 513 541. In some implementations, the signal modulators 507 551 may utilize one single frequency or a specific number of single frequencies when generating the modulation signal. The filter module 560 561 may receive the plurality of reflected light beams and may filter out any of the plurality of reflected light beams whose frequency is not the single frequency (or the other number of single frequencies) generated by the signal modulators 507 551. This also allows the vehicle communication system to filter out and only use the plurality of reflected light beams that are transmitted by the vehicle LED light assemblies 511 and 547. This also improves the accuracy of the vehicle LED communication system 500.

FIG. 6 is a flowchart that illustrates an exemplary method for utilizing a vehicle light emitting diode (LED) light assembly (e.g., a LED head light and tail light) for communications between a first vehicle and a second vehicle, in accordance with an embodiment of the disclosure. FIG. 6 is explained in conjunction with elements from FIGS. 4 and 5. With reference to FIG. 6, there is shown a flowchart 600 comprising exemplary operations 605 to 640

In an exemplary embodiment, one vehicle (or an operator thereof) may desire to communicate information and data to a second vehicle (or an operator thereof). In some implementations, in situations where cellular networks and/or other wireless networks are inoperable due to failure, maintenance and/or weather, one vehicle may need an additional method and/or system for automatic or and/or timely communication of information and data. This is an important application of the LED light assembly vehicle communication system 500 during emergency situations when no other method of communication is available.

A vehicle or operator may generate one or more messages to communicate to another vehicle. These messages may include vehicle speed information, vehicle operation information (e.g., are parts malfunctioning), and/or emergency alert information. At 605, one or more messages may be received and may be encoded to generate one or more encoded messages at an encoder assembly 505.

In exemplary embodiments, a signal modulator 507 may receive the encoded one or more messages. At 610, a signal modulator 507 may generate a modulated encoded signal based on the encoded one or more messages. The signal modulator may communicate the modulated encoded signal to the LED driver module 509.

At 615, a modulated LED transmission signal may be generated by the LED driver module 509 based on the modulated encoded signal. The modulated LED transmission signal may be representative of the encoded one or more messages. In some implementations, the modulated LED transmission signal may modulate an intensity of a plurality of light beams.

The vehicle LED light assembly 511 may receive the modulated LED transmission signal from the LED driver module 509. At step 620, in an exemplary embodiment, a plurality of light beams may be transmitted, utilizing an vehicle LED light assembly 511, based at least in part on the generated modulated LED data transmission signal.

In exemplary embodiments, a second vehicle 520 may receive the plurality of light beams transmitted by the first vehicle 510. In some implementations, the LED light assembly 511 of the first vehicle 510 may be a LED headlight. In this implementation, if the second vehicle 520 is traveling a same direction as the first vehicle 510, one or more receiving light sensors 541 may be located on a back portion of the vehicle (e.g., a vehicle rear bumper). In some implementations, if a second vehicle 520 is traveling an opposite direction as compared to a first vehicle 510, one or more receiving light sensors may be located on a front portion of the vehicle, (e.g., a vehicle front bumper). In some implementations, the LED light assembly 511 of the first vehicle may be an LED taillight. In this implementation, if the second vehicle 520 is traveling a same direction as the first vehicle 510, one or more receiving light sensors 541 may be located on a front portion of the second vehicle 520 (e.g., the second vehicle front bumper). In this implementation, if the second vehicle 520 is travelling an opposite direction from the first vehicle 510, one or more receiving light sensors 541 may be located on a back portion of the second vehicle 520 (e.g., the second vehicle rear bumper).

At step 625, an intensity of the transmitted plurality of light beams transmitted from the first vehicle 510 may be detected by a second vehicle 520, by one or more light sensors 541 positioned on the second vehicle 520. In some implementations, in step 630, the plurality of light sensors 541 may generate a data transmission signal representative of the detected light intensity measurements. In some implementations, the one or more light sensors 541 may communicate the data transmission signal to a demodulator 543.

In exemplary embodiments, the demodulator 543 may receive the data transmission signal. At step 635, the data transmission signal may be demodulated by the demodulator 543 to create a demodulated data transmission signal. In some implementations, the demodulator 543 may transmit the demodulated data transmission signal to the decoder assembly 545.

In exemplary embodiments, the decoder assembly 545 may receive the demodulated data transmission signal. At step 640, the demodulated data transmission signal may be decoded, by the decoder assembly 545, and one or more decoded messages may be created. The one or more decoded messages should be the same or very similar to the generated one or more messages transmitted to the first vehicle's encoder 505 in step 605.

In some implementations, the one or more decoded messages may be stored in one or more memory devices 557 of the second vehicle 520. In some implementations, software instructions 559 stored in the one or more memory devices 557 may be executable by the second vehicle central processors 555 to communicate the one or more decoded messages to other vehicle subsystems of the second vehicle 520.

FIG. 7 illustrates a communication system between a first vehicle, a second vehicle and a third vehicle using a vehicle LED communication system according to some implementations. In exemplary embodiments, the communication system 700 may be utilized in an area where no other communication networks are present (e.g., because of remoteness or due to a communication network that is inoperable). The communication system 700 may include a first vehicle 710, a second vehicle 720, and a third vehicle 730. In some implementations, the first vehicle 710 may have one or more LED assemblies 712 and one or more light sensors 714. In some implementations, the second vehicle 720 may have one or more LED assemblies 722 and one or more light sensors 724. In some implementations, the third vehicle 730 may have one or more LED assemblies 732 and/or one or more light sensors 734. In some implementations, the second vehicle 720 may act as a communication intermediary between the first vehicle 710 and the third vehicle 730, although in other embodiments, all three vehicles 710, 720 and 730 may be communicatively coupled. The encoding and modulating of the one or more messages and the generating of the plurality of modulated light beams for FIG. 7 follows the same methods and apparatus as described in FIGS. 5 and 6. Similarly, the receiving of the modulated light beams, the demodulating of the light beams and the decoding for FIG. 7 follows the same methods and apparatus as described in FIGS. 5 and 6. These operations are not repeated for FIG. 7 for simplicity. As an illustrative example, in some implementations, the first vehicle 710 may communicate one or more encoded messages through a plurality of modulated light beams generated by the first vehicle one or more LED assemblies 712. In some implementations, the one or more light sensors 724 of the second vehicle 720 may receive the plurality of modulated light beams and decode the one or more messages from the first vehicle 710. In some implementations, if the second vehicle 720 is utilized as an intermediary communication vehicle, then the second vehicle may encode the received one or more messages and transmit an intermediary plurality of modulated light beams from the one or more second vehicle LED light assemblies 722 based on the encoded messages. In some implementations, the one or more light sensors 734 of the third vehicle 730 may receive the transmitted intermediary plurality of modulated light beams from the second vehicle and decode the one or more messages. The third vehicle 730 may analyze the received decoded one or more messages and may generate one or more response messages designated for the first vehicle 710. In some implementations, the one or more LED assemblies 732 of the third vehicle 730 may generate and transmit a plurality of response modulated beams based on the one or more response message. In these implementations, the one or more light sensors 724 of the second vehicle 720 may receive the plurality of response modulated beams and the second vehicle 720 may decode the one or more response messages. The second vehicle 720 may encode one or more response intermediary messages. The one or more vehicle LED assemblies 722 of the second vehicle 720 may generate and transmit a plurality of intermediary response light beams. In some implementations, one or more light sensors 714 of the first vehicle may receive the plurality of intermediary response light beams and the first vehicle 710 may decode and analyze the one or more response intermediary messages. In these embodiments, if a vehicle LED taillight is transmitting or communicating the plurality of modulated light beams (e.g., if the first vehicle LED assembly 712 is transmitting through a LED taillight), the receiving vehicle may include a filter module before the one or more light sensors. The filter module may accept and receive only the red colored plurality of light beams and filter out other light beams (e.g., the second vehicle one or more light sensors 724 may include a filter module to accept only the red light from the first vehicle LED assembly 712 in the taillight and to reject all other light beams such as headlight beams from approaching vehicles). The methods described above is available in environments where there is no communication network service, such as in emergency weather situations like the aftermath of a hurricane or earthquake. The subject matter described herein allows vehicles to communicate with each other even if other communication networks are down. The methods described herein also allow for fast, low-latency communications which are important when emergency situations arise and vehicle actions need to be taken quickly. These methods also allow for two or more vehicles to communicate secretly in what appears to be normal vehicle operation and not alert another party or vehicle that vehicle-to-vehicle communications are taking place.

The subject matter described herein with respect to utilizing vehicle LED light assemblies for vehicular light detection and ranging (LIDAR) in FIGS. 1-4 and with respect to utilizing vehicle LED light assemblies to communicate between two or more vehicles in FIGS. 5-7 may be utilized together. In other words, the vehicle LED light assembly LIDAR system and the vehicle LED light assembly communication system may be combined in the same vehicle. The vehicle may utilize the methods described herein in FIGS. 1-4 (the method of utilizing LED light assemblies for LIDAR) and FIGS. 5-7 (the method of utilizing LED light assemblies for communication between vehicles) to assist in operation of various subsystems of the vehicle (e.g., self-driving subsystem, navigation subsystem, braking subsystem or steering subsystem or other subsystems described in FIG. 4.

In some embodiments, a method of communicating between a first vehicle and a second vehicle utilizing light-emitting diode (LED) light assemblies include encoding a vehicle data transmission from a first vehicle; generating a modulation signal based on the encoded vehicle data transmission; generating, via a vehicle LED driver module, a modulated LED data transmission signal, based at least in part on the modulation signal representative of the encoded vehicle data transmission, the modulated LED data transmission signal to modulate an intensity of the light beams; and transmitting a plurality of light beams, utilizing a vehicle LED light assembly, based at least in part on the generated modulated LED data transmission signal. The method of communicating between a first vehicle and a second vehicle also includes detecting, via one or more light sensors positioned on the second vehicle, an intensity of the plurality of light beams transmitted from LED light assembly on the first vehicle; generating, via the one or more light sensors, a data transmission signal representative of the captured intensity of the plurality of light beams; demodulating, via a demodulator module, the data transmission signal representative of the captured intensity of the plurality of light beams; and decoding the demodulated data transmission signal to obtain the original vehicle data transmission. The method of communicating between a first vehicle and a second vehicle further includes encoding a response vehicle data transmission from the second vehicle; generating a modulation signal based on the encoded response vehicle data transmission; generating, via a second LED driver module, a modulated LED data transmission response signal, based at least in part on the modulation signal representative of the encoded response vehicle data transmission, the modulated LED data transmission response signal to modulate an intensity of the light beams; transmitting a plurality of response light beams, utilizing an vehicle LED light assembly, based at least in part on the generated modulated LED data transmission response signal. In addition, the method of communication between a first vehicle and a second vehicle detecting, via one or more light sensors positioned on the first vehicle, an intensity of the plurality of light beams transmitted from the vehicle LED light assembly on the first vehicle; generating, via the one or more light sensors on the first vehicle, a response data transmission signal representative of the captured intensity of the plurality of response light beams; demodulating, via a demodulator module, the response data transmission signal representative of the captured intensity of the plurality of response light beams; and decoding the demodulated response data transmission signal to obtain the original response vehicle data transmission.

In some embodiments, a system to communicate between a first vehicle and a second vehicle utilizing vehicle light-emitting diode assemblies, includes an encoding assembly to encode a vehicle data transmission from a first vehicle; a signal modulator to generate a modulation signal based on the encoded vehicle data transmission; a vehicle LED driver module to generate a modulated LED data transmission signal, based at least in part on the modulation signal representative of the encoded vehicle data transmission, the modulated LED data transmission signal to modulate an intensity of the light beams; and a vehicle LED light assembly, positioned on the first vehicle, to transmit a plurality of light beams based at least in part on the generated modulated LED data transmission signal. In some embodiments, a system to communicate between a first vehicle and a second vehicle utilizing vehicle light-emitting diode assemblies, includes one or more light sensors, positioned on a second vehicle, to detect an intensity of the plurality of light beams transmitted from the vehicle LED light assembly on the first vehicle and to generate a data transmission signal representative of the captured intensity of the plurality of light beams; a demodulator module on the second vehicle, to demodulate the data transmission signal representative of the captured intensity of the plurality of light beams; and a decoder assembly to decoding the demodulated data transmission signal to obtain the original vehicle data transmission.

In some embodiments, the method of communicating between a first vehicle, a second vehicle and a third vehicle utilizing vehicle light-emitting diode (LED) light assemblies, includes detecting, via one or more light sensors positioned on the second vehicle, an intensity of the plurality of light beams transmitted from a vehicle LED light assembly on the first vehicle; generating, via the one or more light sensors of the second vehicle, a data transmission signal representative of the detected intensity of the plurality of light beams; demodulating, via a demodulator module, the data transmission signal representative of the captured intensity of the plurality of light beams; decoding the demodulated data transmission signal to obtain the original vehicle data transmission from the first vehicle; and encoding, at the second vehicle, the original vehicle data transmission. The method of communicating between a first vehicle, a second vehicle, and a third vehicle utilizing vehicle LED light assemblies also includes generating, at the second vehicle, an intermediary modulation signal based on the encoded original vehicle data transmission; generating, at the second vehicle, via a second vehicle LED driver module, a modulated intermediary LED data transmission signal, based at least in part on the intermediary modulation signal representative of the encoded original vehicle data transmission, the intermediary modulated LED data transmission signal to modulate an intensity of the light beams; and transmitting, to the third vehicle, a plurality of intermediary light beams, utilizing a second vehicle LED light assembly, based at least in part on the generated intermediary modulated LED data transmission signal.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising."

The processor as disclosed herein can be configured with instructions to perform any one or more steps of any method as disclosed herein.

As used herein, the term "or" is used inclusively to refer items in the alternative and in combination.

As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

What is claimed is:

1. A communication system to communicate between a first vehicle and a second vehicle utilizing vehicle light-emitting diode (LED) light assemblies, comprising:
   an encoder configured to encode a vehicle data transmission from the first vehicle;
   a modulator configured to generate a modulation signal based on the encoded vehicle data transmission;
   a vehicle LED driver module, configured to generate a modulated LED data transmission signal, based at least in part on the modulation signal representative of the encoded vehicle data transmission, the modulated LED data transmission signal to modulate an intensity of light beams;
   a first vehicle LED light assembly, configured to transmit a plurality of light beams, based at least in part on the generated modulated LED data transmission signal;
   one or more light sensors configured to detect, an intensity of a response plurality of light beams transmitted from a LED light assembly on the second vehicle, generating, via the one or more light sensors, a response data transmission signal representative of the captured intensity of the plurality of light beams;
   a demodulator module configured to demodulate, the response data transmission signal representative of the captured intensity of the response plurality of light beams; and
   a decoder configured to decode the demodulated response data transmission signal to obtain a response vehicle data transmission, which is a response to the vehicle data transmission,
   wherein the first LED light assembly is a headlight assembly or a taillight assembly and the one or more light sensors are located on a same part of the second vehicle as a headlight assembly or a taillight assembly.

2. The system of claim 1, wherein the modulation signal utilizes binary or multilevel modulation.

3. The system of claim 1, wherein the modulation signal has a frequency ranging from 100 Megahertz to 300 Megahertz, or alternatively from 75 Megahertz to 600 Megahertz.

4. The system of claim 1, wherein the vehicle data transmission includes information about a speed of the first vehicle or about an operating capability of the first vehicle.

5. A system for measuring a distance between a vehicle and one or more objects and utilizing distance measurements, comprising:
   a modulator in the vehicle configured to generate a modulation signal;
   a vehicle headlight or taillight LED driver assembly configured to generate a modulated light emitting diode (LED) transmission signal, based at least in part on the modulation signal;
   a vehicle LED headlight or taillight assembly configured to transmit a plurality of light beams, based at least in part on the generated modulated LED transmission signal;
   one or vehicle lens assembly and a camera configured to capture a reflection of the plurality of light beams off the one or more objects, the camera including an array of pixel sensors and being positioned on the vehicle;
   the camera and the array of pixel sensors to communicate a series of measurements representing the captured plurality of light beam reflections;
   a time-of-flight sensor module configured to receive the series of measurements and to calculate time of flight measurements between the vehicle LED headlight or taillight assembly and the one or more objects, based at least in part on the series of measurements; and
   a depth processor module, configured to calculate distances between the vehicle LED headlight or taillight assembly and the one or more objects based on the time-of-flight measurements and to transmit the calculated distances to one or more vehicle subsystems or components.

6. The system of claim 5, wherein the one or more vehicle subsystems or components is a vehicle braking system and if the calculated distances are less than a specified distance, the vehicle braking system activates one or more vehicle brakes.

7. The system of claim 5, wherein the one or more vehicle subsystems or components is a vehicle navigation system, and generating, by the vehicle navigation subsystem, a three-dimensional (3D) map of the one or more objects with respect to the vehicle based on the calculated distances.

8. The system of claim 5, wherein the one or more vehicle subsystems or components is a vehicle transmission subsystem and if the calculated distances are less than a specified distance, the vehicle transmission subsystem deactivates or disengages a vehicle transmission.

9. The system of claim 5, wherein the one or more vehicle subsystems or components is a vehicle display system and the vehicle display subsystem configured to generate a display identifying specific distances between the vehicle LED headlight assembly and the one or more objects.

10. The system of claim 5, wherein the one or more vehicle subsystems or components is a vehicle audio system, and if the calculated distances are too small, the vehicle audio system configured to generate an audible sound identifying the vehicle is too close to the one or more objects.

11. The system of claim 5, wherein the one or more vehicle subsystems or components is a self-driving subsystem, and the self-driving subsystem configured to further analyze the calculated distances and automatically communicate instructions to other vehicle subsystems.

12. The system of claim 5, wherein the camera and the modulation signal are synchronized.

13. The system of claim 12, where the synchronization of the camera and the modulation signal utilizes code divisional multiple (CDMA) technology to generate a specific code and the camera including the array of pixel sensors captures the reflection of the plurality of light beam reflections.

14. A system of communicating between a first vehicle and a second vehicle utilizing vehicle light-emitting diode (LED) headlight or taillight assemblies, comprising:
- a first vehicle encoder configured to encode a vehicle data transmission from a first vehicle, the vehicle data transmission including communications to one or more second vehicle subsystems;
- a modulator configured to generate a modulation signal based on the encoded vehicle data transmission;
- a first vehicle LED driver module configured to generate a modulated LED data transmission signal, based at least in part on the modulation signal representative of the encoded vehicle data transmission, the modulated LED data transmission signal to modulate an intensity of light beams;
- a first vehicle LED headlight or taillight assembly configured to transmit a plurality of light beams, utilizing, based at least in part on the generated modulated LED data transmission signal;
- one or more second vehicle light sensors positioned on the second vehicle configured to detect an intensity of the plurality of light beams transmitted from the first vehicle LED headlight or taillight assembly, the one or more second vehicle light sensors configured to generate a data transmission signal representative of the detected intensity of the plurality of light beams;
- a second vehicle demodulator module configured to demodulate the data transmission signal representative of the detected intensity of the plurality of light beams and generate a demodulated data transmission signal; and
- a second vehicle decoder configured to decode the demodulated data transmission signal to obtain or generate the vehicle data transmission of the first vehicle and to send the vehicle data transmission to the one or more second vehicle subsystems.

15. The system of claim 14, wherein the modulation signal utilizes multilevel modulation and has a frequency ranging from 100 Megahertz to 300 Megahertz, or alternatively from 75 Megahertz to 600 Megahertz.

16. The system of claim 14, wherein the data transmission of the first vehicle includes information about a speed of the first vehicle or an operating capability of the first vehicle.

17. The system of claim 14, wherein the one or more second vehicle subsystems is a vehicle navigation subsystem.

18. The system of claim 14, wherein the one or more second vehicle subsystems is a vehicle self-driving subsystem.

19. The system of claim 14, wherein the one or more second vehicle subsystems is a vehicle audio subsystem.

\* \* \* \* \*